(12) United States Patent
Tusk

(10) Patent No.: US 9,529,824 B2
(45) Date of Patent: Dec. 27, 2016

(54) SYSTEM AND METHOD FOR MULTI RESOLUTION AND MULTI TEMPORAL IMAGE SEARCH

(71) Applicant: DigitalGlobe, Inc., Longmont, CO (US)

(72) Inventor: Carsten Tusk, Seattle, WA (US)

(73) Assignee: DigitalGlobe, Inc., Longmont, CO (US)

( * ) Notice: Subject to any disclaimer, the term of this patent is extended or adjusted under 35 U.S.C. 154(b) by 58 days.

(21) Appl. No.: 14/091,412

(22) Filed: Nov. 27, 2013

(65) Prior Publication Data

US 2014/0365463 A1 Dec. 11, 2014

Related U.S. Application Data

(63) Continuation of application No. 13/910,973, filed on Jun. 5, 2013, now abandoned.

(51) Int. Cl.
*G06F 17/30* (2006.01)

(52) U.S. Cl.
CPC ................ *G06F 17/30247* (2013.01)

(58) Field of Classification Search
CPC .................... G06F 17/00; G06F 17/30
See application file for complete search history.

(56) References Cited

U.S. PATENT DOCUMENTS

| | | | | |
|---|---|---|---|---|
| 5,185,667 A | * | 2/1993 | Zimmermann | 348/207.99 |
| 5,313,306 A | * | 5/1994 | Kuban et al. | 348/65 |
| 5,359,363 A | * | 10/1994 | Kuban et al. | 348/36 |
| 5,384,588 A | * | 1/1995 | Martin et al. | 348/14.1 |
| 5,500,886 A | * | 3/1996 | Duff | 378/207 |
| 5,640,233 A | * | 6/1997 | McArthur et al. | 356/124 |
| 5,802,493 A | * | 9/1998 | Sheflott | G06F 17/30 705/1.1 |
| RE36,207 E | * | 5/1999 | Zimmermann et al. | 348/207.99 |
| 5,976,076 A | * | 11/1999 | Kolff et al. | 600/166 |
| 6,009,442 A | * | 12/1999 | Chen et al. | 715/205 |
| 6,237,011 B1 | * | 5/2001 | Ferguson et al. | 715/234 |
| 6,352,508 B1 | * | 3/2002 | Pang et al. | 600/443 |
| 6,463,426 B1 | * | 10/2002 | Lipson | G06F 17/30247 |
| 6,480,231 B1 | * | 11/2002 | Bernstein et al. | 348/448 |
| 6,721,733 B2 | * | 4/2004 | Lipson | G06F 17/30247 |
| 6,810,404 B1 | * | 10/2004 | Ferguson et al. | |
| 6,820,094 B1 | * | 11/2004 | Ferguson et al. | |

(Continued)

OTHER PUBLICATIONS

Sowmya, Arcot, et al., "Modelling and representation issues in automated feature extraction from aerial and satellite images," 2000, Elsevier Science, ISPRS Journal of Photogrammetry and Remote Sensing, issue 55, pp. 34-47 (14 total pages).*

(Continued)

*Primary Examiner* — Farhan Syed
(74) *Attorney, Agent, or Firm* — Galvin Patent Law LLC; Brian R. Galvin

(57) ABSTRACT

A system for modular image mining and search, comprising a plurality of image capture devices, a search engine, an indexing engine, a database, and user interface software. A plurality of image capture devices capture images and store them to a database. The indexing engine indexes images to create image data for each image with associated metadata and stores the information to the database. The interface software is used to request search queries via a search engine. The search engine accesses the image data to find images or parts of images that satisfy the search query.

3 Claims, 7 Drawing Sheets

(56) References Cited

U.S. PATENT DOCUMENTS

| | | | |
|---|---|---|---|
| 7,068,853 B2* | 6/2006 | Loveridge et al. ............ 382/274 |
| 7,182,424 B2* | 2/2007 | Kubota ............................ 347/19 |
| 7,272,593 B1* | 9/2007 | Castelli et al. ................. 707/600 |
| 7,382,399 B1* | 6/2008 | McCall et al. ............ 348/207.99 |
| 7,800,681 B2* | 9/2010 | Azuma .......................... 348/335 |
| 7,860,854 B2* | 12/2010 | Lipson .............. G06F 17/30247 707/707 |
| 7,899,915 B2* | 3/2011 | Reisman ........... G06F 17/30873 709/227 |
| 7,936,945 B2* | 5/2011 | Soinio et al. .................. 382/275 |
| 7,966,327 B2* | 6/2011 | Li et al. ......................... 707/737 |
| 8,005,286 B2* | 8/2011 | Grasruck et al. .............. 382/131 |
| 8,040,579 B2* | 10/2011 | Nagahara et al. ............. 358/501 |
| 8,054,374 B2* | 11/2011 | Chou et al. .................... 348/362 |
| 8,199,228 B2* | 6/2012 | Masuda ......................... 348/254 |
| 8,228,548 B2* | 7/2012 | Saida ............................ 358/1.16 |
| 8,345,299 B2* | 1/2013 | Aoki et al. .................... 358/1.18 |
| 8,374,914 B2* | 2/2013 | Valencia-Campo et al. ........................... 705/14.43 |
| 8,447,752 B2* | 5/2013 | Wang et al. ................... 707/711 |
| 8,473,499 B2* | 6/2013 | Song ................. G06Q 50/10 706/20 |
| 8,477,987 B2* | 7/2013 | Erikkala ........................ 382/100 |
| 8,504,547 B1* | 8/2013 | Yee et al. ...................... 707/706 |
| 8,660,849 B2* | 2/2014 | Gruber ............... G06F 17/3087 340/988 |
| 8,670,979 B2* | 3/2014 | Gruber ............... G06F 17/3087 704/10 |
| 8,676,937 B2* | 3/2014 | Rapaport ................ H04L 51/32 709/219 |
| 2001/0012395 A1* | 8/2001 | Michael et al. ............... 382/152 |
| 2003/0018631 A1* | 1/2003 | Lipson .............. G06F 17/30247 |
| 2005/0004897 A1* | 1/2005 | Lipson .............. G06F 17/30247 |
| 2006/0101060 A1* | 5/2006 | Li et al. ......................... 707/102 |
| 2007/0118399 A1* | 5/2007 | Avinash ............... G06F 19/322 705/2 |
| 2007/0299750 A1* | 12/2007 | Aoki et al. ....................... 705/29 |
| 2008/0046410 A1* | 2/2008 | Lieb .................................. 707/3 |
| 2010/0066699 A1* | 3/2010 | Takahashi ..................... 345/173 |
| 2011/0106845 A1* | 5/2011 | Lipson .............. G06F 17/30247 707/769 |
| 2011/0125734 A1* | 5/2011 | Duboue ................... G09B 7/00 707/723 |
| 2011/0219025 A1* | 9/2011 | Lipson .............. G06F 17/30247 707/769 |
| 2011/0262028 A1* | 10/2011 | Lipson .............. G06F 17/30247 382/147 |
| 2011/0282481 A1* | 11/2011 | Lipson .............. G06F 17/30247 700/110 |
| 2011/0282900 A1* | 11/2011 | Lipson .............. G06F 17/30247 707/769 |
| 2011/0302206 A1* | 12/2011 | Lipson .............. G06F 17/30247 707/771 |
| 2012/0002880 A1* | 1/2012 | Lipson .............. G06F 17/30247 382/195 |
| 2012/0072410 A1* | 3/2012 | Wang et al. ................... 707/711 |
| 2012/0121193 A1* | 5/2012 | Lipson .............. G06F 17/30247 382/218 |
| 2012/0124478 A1* | 5/2012 | King ................. G06F 17/30943 715/738 |
| 2012/0290950 A1* | 11/2012 | Rapaport ................ H04L 51/32 715/753 |
| 2013/0097178 A1* | 4/2013 | Song ..................... G06Q 50/10 707/748 |
| 2014/0019484 A1* | 1/2014 | Coppin et al. ................ 707/772 |
| 2014/0344718 A1* | 11/2014 | Rapaport ................ H04L 51/32 715/753 |
| 2014/0358928 A1* | 12/2014 | Alkov ............... G06F 17/30705 707/738 |
| 2014/0359421 A1* | 12/2014 | Allen .................... G06F 17/241 715/230 |
| 2014/0365502 A1* | 12/2014 | Haggar .................... G06N 5/02 707/748 |

OTHER PUBLICATIONS

Nussbaum, S., et al., "SEATH—A New Tool for Automated Feature Extraction in the Context of Object-Based Image Analysis," 2006, IEEE, Conference on Object-based Image, pp. 1-6 (6 total pages).*

Li, Huiqi, "Automated Feature Extraction in Color Retinal Images by a Model Based Approach," Feb. 2, 2004, IEEE Transactions on Biomedical Engineering, vol. 51, No. 2, pp. 246-254 (9 total pages).*

Xu, Li-Quan, et al., "Video Classification using Spatial-Temporal Features and PCA," 2003, IEEE ICME, pp. 485-489 (4 total pages).*

Li, Jiang, and Ram M. Narayanan. "Integrated spectral and spatial information mining in remote sensing imagery." Geoscience and Remote Sensing, IEEE Transactions on 42, No. 3 (2004): 673-685.*

Climer, Sharlee, and Sanjiv K. Bhatia. "Image database indexing using JPEG coefficients." Pattern Recognition 35, No. 11 (2002): 2479-2488.*

Hsu, Wynne, Jing Dai, and Mong Li Lee. "Mining viewpoint patterns in image databases." In Proceedings of the ninth ACM SIGKDD international conference on Knowledge discovery and data mining, pp. 553-558. ACM, 2003.*

Chen, Ming-Syan, Jiawei Han, and Philip S. Yu. "Data mining: an overview from a database perspective." Knowledge and data Engineering, IEEE Transactions on 8, No. 6 (1996): 866-883.*

Prasad, B. G., Kanad K. Biswas, and S. K. Gupta. "Region-based image retrieval using integrated color, shape, and location index." computer vision and image understanding 94, No. 1 (2004): 193-233.*

Bertino, Elisa, Beng Chin Ooi, Ron Sacks-Davis, Kian-Lee Tan, Justin Zobel, Boris Shidlovsky, and Barbara Catania. "Image Databases." In Indexing Techniques for Advanced Database Systems, pp. 77-112. Springer US, 1997.*

* cited by examiner

SYSTEM AND METHOD FOR MULTI RESOLUTION AND MULTI TEMPORAL IMAGE SEARCH

CROSS-REFERENCE TO RELATED APPLICATIONS

This application is a continuation of U.S. patent application Ser. No. 13/910,973, titled "MODULAR IMAGE MINING AND SEARCH", filed on Jun. 5, 2013, the entire specification of which is incorporated hereby by reference.

BACKGROUND OF THE INVENTION

1. Field of the Invention

The invention relates to the field of data analysis, and more particularly to the field of image mining and searching.

2. Discussion of the State of the Art

In the field of data analysis, search engines are commonly utilized in a variety of fields and for a variety of use cases, such as text-based searching of documents, keyword-based searching for information on a network such as the Internet, or "fuzzy" searching using algorithms to search over non-text or mixed-media data, such as (using a single example in the current art) Google™ reverse image search, that enable users to select an image and search the Internet or other data for any similar images. However, there are limitations present that prevent full realization of the utility of search engines, particularly in the area of image search and analysis.

There exist solutions that allow for basic search of an image base, such as Google™ reverse image search as previously mentioned. Such search engines typically operate by identifying similarities between images, or by identifying image content such as with "tags" or other identifiers for use in keyword or other text-based searches. There is currently no provision for searching with greater granularity as may be common in text-based searches—for example, a user might search within a selection of document text or take a count of occurrences of a specific keyword or phrase, but such an operation is not currently possible when dealing with image data. Current image search paradigms are focused on basic image comparison and are limited in their scope. Text-based image search currently only accommodates tag text, and depends on humans to tag images, which will not typically be practical for large image data sets such as are obtained from satellites.

Moreover, images often contain implicitly hierarchical information. For example, some image features may be relevant or meaningful at a pixel level of granularity, such as land cover classification or texture roughness; others may be relevant at a regional (i.e., region within an image) level of granularity, such as shapes, arrangements of objects, and object identification and classification; and yet others may only be relevant or meaningful at a scene (whole image or collection of images) level, such as percentage of land cover or use, object counts in an area, or high-level classification of areas such as deserts, cities, lakes, and the like. Tag-based text search does not capture this richness of information, and many such hierarchical image features would not normally be tagged by humans in any case.

Common image search approaches in the art also fail to allow for scalable operation, in both the scope and the method of search, as well as system architecture. Existing solutions are limited to simple image comparison operations ("find images like this one") or basic keyword data ("find images related to this topic"), preventing detailed or more precise identification or searching of image information. They further fail to incorporate a modular approach to search logic, such as allowing for a variety of search logic modules that may be added, removed, or altered without interrupting operation or requiring manipulation of other elements of a search engine or system.

What is needed is an image search and mining system that allows for scalable operation. Preferably, such a system should be modular to allow incremental development without interfering with ongoing operations, and should allow users to search with variable granularity over a large base of image data keyword search queries.

SUMMARY OF THE INVENTION

Accordingly, the inventor has conceived and reduced to practice, in a preferred embodiment of the invention, a system and method for image data mining and searching such mined image data. The system comprises a plurality of image capture devices each adapted to handle interactions of one or more media types, an indexing engine software module for indexing and categorization of images, an image information database stores image data and indices from the indexing engine module, an interface software module for searching images and elements, and a search engine software module to perform searches. According to the embodiment, the indexing engine indexes and categorizes image data captured by a plurality of image capture devices and stores image data and indices to a database. The search engine receives search requests from users via the interface software module for searching elements and features within an image using indices and image data of captured images.

According to a preferred embodiment of the invention, the inventor has conceived and reduced to practice a method for searching mined image data, the method comprising the steps of indexing image data using an index engine based on images captured from a plurality of image capture devices, and stores image data and indices in a database. According to the embodiment, searching image data and image indices is performed using a search engine software module based on input by a user through an interface software module.

According to a preferred embodiment of the invention, the inventor has conceived and reduced to practice a system for searching over multiple resolutions on a multi-temporal grid of images, the system comprises a plurality of resolutions of an image from a plurality of images captured by a plurality of image capture devices where a plurality of resolutions are decomposed from an image captured by a plurality of image capture devices and a plurality of images are captured by a plurality of image capture devices over a period of time. According to the embodiment, the search engine selects an appropriate image resolution from a set of resolutions to conduct a search of features and elements within the images by using indices and image data from the database of images by conducting a search of images or changes within a scene over a period of time in a set of images captured by a plurality of image capture devices.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
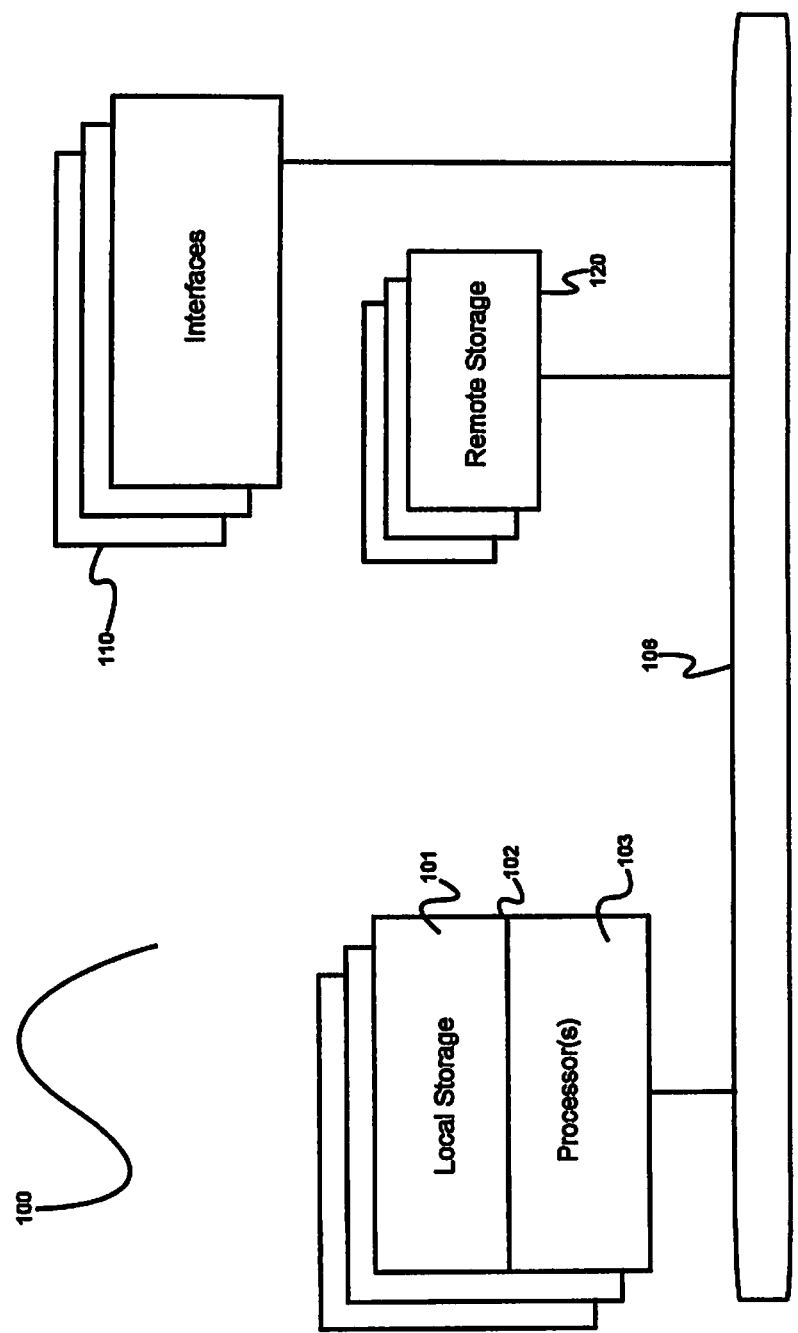
FIG. 1 is a block diagram illustrating an exemplary hardware architecture of a computing device used in an embodiment of the invention.

The inventor has conceived, and reduced to practice, a system and method for image mining and search.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, a "feature" is an individual measurable heuristic property of a phenomenon being observed.

As used herein, a "pixel-level feature" is a feature at a base level of classification. For example, textural properties, a land-cover classification, etc.

As used herein, a "region-level feature" is a feature at a higher level of classification. For example, observations that may have shape properties (such as, area, perimeter, compactness, elongation, eccentricity, etc.), spatial relationships (such as, arrangement, distance, etc.), object classifications (for example, a school, paring lot, swimming pool, plane, shopping mall, etc.), and the like.

As used herein, a "scene-level feature" is a feature that may aggregate statistics on lower level features, such as, percentage land cover (for example, 25% deciduous forest, 10% water, etc.), aggregate object counts (for example, 10 schools, 35 parking lots, etc.), other descriptive classifications (for example, desert, city, rainforest, etc.)

As used herein, a "graphics processing unit (GPU)" is a specialized electronic circuit known in the art that is designed to rapidly manipulate and alter memory to accelerate the creation of images in a frame buffer intended for output to a display or for other computational purposes.

As used herein, a "Compute Unified Device Architecture (CUDA)" is a parallel computing platform and programming model known in the art created by NVIDIA™ and implemented by the graphics processing units (GPUs) that they produce that gives developers access to a virtual instruction set and memory of the parallel computational elements in CUDA GPUs.

As used herein, an "Interactive Data Language (IDL)" is a programming language known in the art used for data analysis.

As used herein, a "shard" is a database partitioning technique known in the art where each individual partition is referred to as a shard or database shard.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
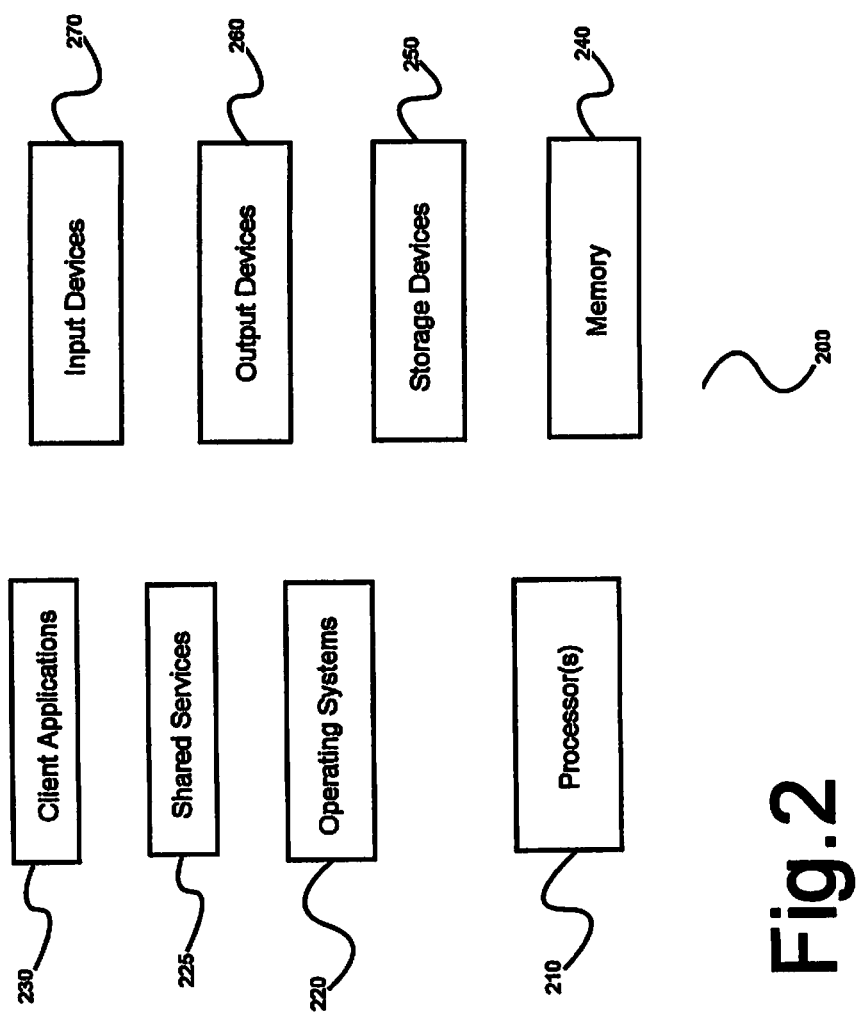
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
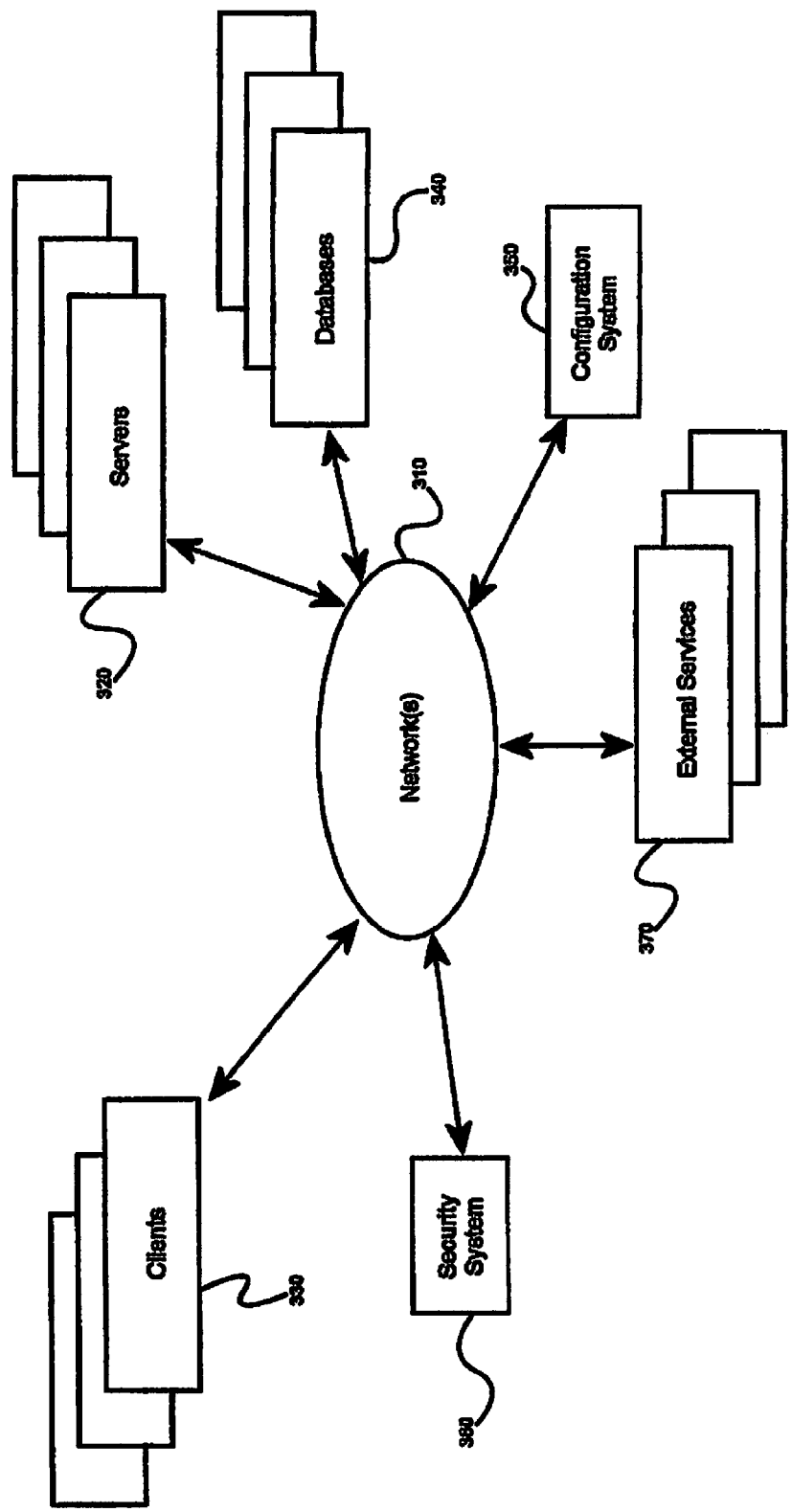
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 4:
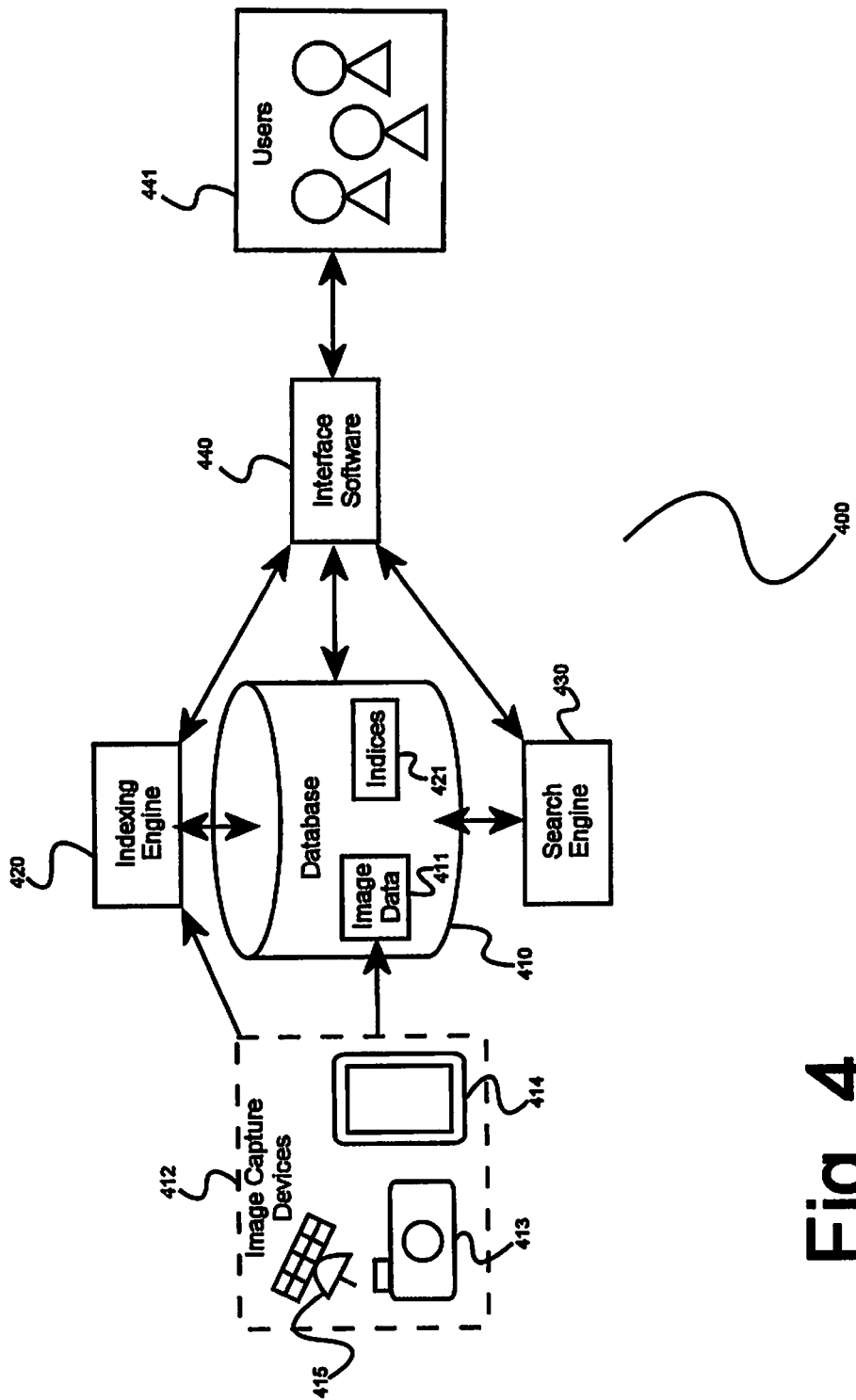
FIG. 4 is a block diagram illustrating an exemplary system for image mining and search, according to a preferred embodiment of the invention.

FIG. 4 is a block diagram illustrating an exemplary system 400 for modular image mining and search, according to a preferred embodiment of the invention. As illustrated, system 400 may comprise a plurality of software or hardware elements that may be variably interconnected, and it should be appreciated that such components may be variable in implementation; that is, components may be software-based and stored and operating on separate or joined hardware systems interchangeably (for example by running multiple software systems on a single computer server), or may be physically-distinct hardware such as dedicated computing hardware for specific elements as illustrated. It should be further appreciated that connections between components as illustrated may be direct physical connections (such as via cables or internal software connectivity within a hardware system operating multiple components as described above) or they may be remote data connections such as communication over the Internet or another communications network. In this manner, it should be appreciated that the constructions and arrangement illustrated is exemplary, and a variety of arrangements may be possible according to the invention, and it should be further appreciated that the quantity and arrangement of components is exemplary and alternate or additional components may be utilized according to the invention. In this manner it can be appreciated that the nature of the invention is flexible and scalable, i.e. it may be arranged as suitable for varying particular implementations as may be appropriate (such as a small-scale implementation utilizing software elements operating within a personal computer for individual use, or a large-scale implementation utilizing separate computer servers for operation utilizing greater computing power or storage space, as may be desirable for an enterprise or cloud-based service).

As illustrated, image data 411 may be made available to an indexing engine 420, and may be stored in a database 410 or similar data storage. Image data 411 may be of variable nature such as simple stored images or more detailed information or "metadata" stored along with images such as image tags or other identifying data (such as, as is common in the art, data pertaining to when, where, or how an image was captured, such as might be recorded by a camera 412 when taking a snapshot). Furthermore, image data 411 need not be an existing cache of stored data, and could be a quantity of "live" data being accessed by system 400 for operation such as capturing images via any appropriate image-capture devices 412 connected to system 400 such as cameras 413, image capture-capable electronic devices such as tablet computing devices or smartphones 414, or aerial or satellite imaging systems 415, in order that captured images may be indexed directly without first being stored. In some embodiments image data 411 may be stored separately from indices 421.

It should be appreciated that the use of a database 410 is exemplary, and that image storage may be accomplished via a variety of means common in the art, such as a single physical storage medium (such as magnetic, optical, solid-state, or other storage devices common in the art), or a distributed storage system (such as a distributed file storage system as may be utilized in computing clusters), and further that such storage may be local (i.e., stored and operating alongside other components of system 400 such as a server's hard disk drive or a connected storage system) or remote (such as a remotely-connected and accessible storage device or a cloud-based storage service), and that connection may be accomplished via either physical or remote means, as described previously. In this manner it should be appreciated that image storage is highly variable according to the invention, further enabling a flexible and scalable design that may be readily adapted to a variety of storage means as may be appropriate, without necessitating the manipulation of existing data.

As further illustrated, indexing engine 420 may operate upon image data 411, such as for such purposes as identifying image details or refining any existing metadata as described above. Such indexing may involve the incorporation of known or stored index data to iterate over a quantity of image data (such as filtering or organizing images according to preset or configurable criteria), or may involve "active" processing such as scanning an image to identify features.

Such indexing or processing might be variable such as indexing according to different scale or granularity, with varying quality or quantity of index data 421 produced. For example, in a "pixel-level" indexing operation, individual pixels within an image may be scanned and identified such as to determine textural information (such as may be appropriate in determining whether a photographed object is made of metal or wood, or for determining terrain in a satellite image of an area), or for determining "segmentation" of image elements (such as identifying the separation of individual objects, like separating buildings in a photograph of a skyline or the edge of a forest in a satellite image). In a further "region-level" indexing operation, an image may be processed for mid-level granular information, optionally using pixel-level information from a previous indexing operation. For example, using previously indexed segmentation information, a region-level indexing operation might identify the nature of objects or regions identified previously (continuing from the previous example, identifying that one region of a satellite image is a forest while another is an urban sprawl, or identifying specific buildings in a city). In a further "scene-level" indexing operation, an image may be processed for the highest level of granular information, such as (again, continuing previous examples) analyzing what percentage of a satellite image is forested, or counting the number of buildings in a skyline image. It should be appreciated that in this manner, image indexing engine 420 may process many types of image data in a variety of ways to generate index information 421, which may then be stored (such as in a database 410) for further use or refinement. Preferably, indexing will support hierarchical relationships, so that a complex text-based hierarchy of features present in an image or a corpus of images can be searched directly. It should be further appreciated that indexing operations described above are exemplary in nature and execution, and that operations may be performed independently of one another with no prior index data 421 required. In this manner, an initial indexing operation may be performed on image data 411, and subsequently image data 411 may be indexed further optionally incorporating previous indices 421 such as to refine the resultant output of a present or prior operation. It should be appreciated that in this manner a wide variety of operations may be performed according to the invention, and further that the highly variable nature of indexing engine 420 allows further flexibility of system 400 by enabling operation with a variety of image data and for a variety of purposes and utilizing a variety of index operations.

As further illustrated, resultant indices 421 from an indexing operation may be stored for further use or reference, such as in a database 410 or other data storage medium as described previously. Indices 421 may then be further refined by subsequent indexing operations by indexing engine 420 (such as to incorporate pixel-level indices for a more relevant region-level indexing operation as described above and as described below with reference to FIG. 5), and may also be made accessible to search engine 430 such as to enable querying of index data 421. In this manner, indexing engine 420 may process image data 411, and then search engine 430 may utilize resulting indices 421 to perform a more relevant or precise search operation.

Search engine 430 may be utilized as illustrated, such as to query index data 421 or other image data, and may utilize any of a variety of novel or existing search algorithms or methods. Search operations may be variable in nature, and it should be appreciated that due to the highly flexible nature of both image data 411 and indexing operations previously described, search engine 430 may be very broad in scope of operation. In this manner it should be appreciated that existing search engines may be utilized according to the invention, enabling convenient integration of system 400 with existing technologies. In this manner existing search functionalities may be utilized to process image data 411 or indices 421, and the utility of system 400 is not dependent upon novel search algorithms though it may be improved or expanded by them.

An interface 440 may be utilized to provide an accessible means for users 441 to interact with the various components of system 400, such as to submit queries to search engine 430 or to configure or execute operation of indexing engine 420 (such as, for example, interacting with an indexing operation during execution such as for refining manually-input indexing configuration or viewing an operation's progress), or even to directly view stored data such as contents of image base 411 or index data 421. Such an interface may be a fully-featured software user interface such as is common in software applications, a web-enabled interface such as is commonly utilized for interaction with Internet search engines, a dedicated physical device running software components tailored for function with other components of system 400, or may be a lower-level software application programming interface (API) such as to enable the creation or alteration of software elements to interface with system 400, such as may be desirable for a corporate implementation of system 400 where an IT department may desire to create a custom interface for internal use. In this manner, it should be appreciated that existing software interfaces may be utilized by "plugging into" a software API 440, facilitating a smooth transition for users and a more flexible operation overall. For example, according to the arrangement illustrated, an existing search engine 430 and corresponding interface 440 (such as Google Search™ or Bing™) may be utilized according to the invention, with expanded functionality facilitated by operation of an indexing engine 420 and any desirable configuration or modification performed at a program code level, such that from the perspective of an end user it may appear that they are using a familiar and unaltered product but the benefits of system 400 may be realized immediately (such as improved or increased functionality or improved search results).

In this manner it should be appreciated that individual components of system 400 may vary in nature and may utilize existing technologies, and that overall function of system 400 is highly flexible in nature and scalable with regards to any particular implementation. Such a modular nature is useful in that it facilitates a variety of functions not possible in a rigid, fixed-configuration operational model. For example, it becomes possible to utilize incremental updates or alterations to system 400, such as (for example) construction of new indexing engine functionality which may then be incorporated seamlessly without alteration to any other component, or implementation of additional components without interfering with existing ones. Additionally, it becomes possible to use distributed operation, such as individual components operating independently of one another or by independent service providers or vendors (i.e., a "software as a service" model wherein each component may be a separate service potentially each offered by different vendors), or a more basic logical distribution such as maintaining each component as a distinct and independent software module, easing operation for developers or operators that may operate a specific component without needing to be familiar with others. It should be further appreciated that the uses of system 400 may vary considerably, and that due to the flexible nature such a system may be useful and desirable for a wide variety of purposes and in a wide variety of fields. Some examples of use are given below in greater detail, referring now to FIG. 5.

DETAILED DESCRIPTION OF EXEMPLARY EMBODIMENTS

Figure 5:
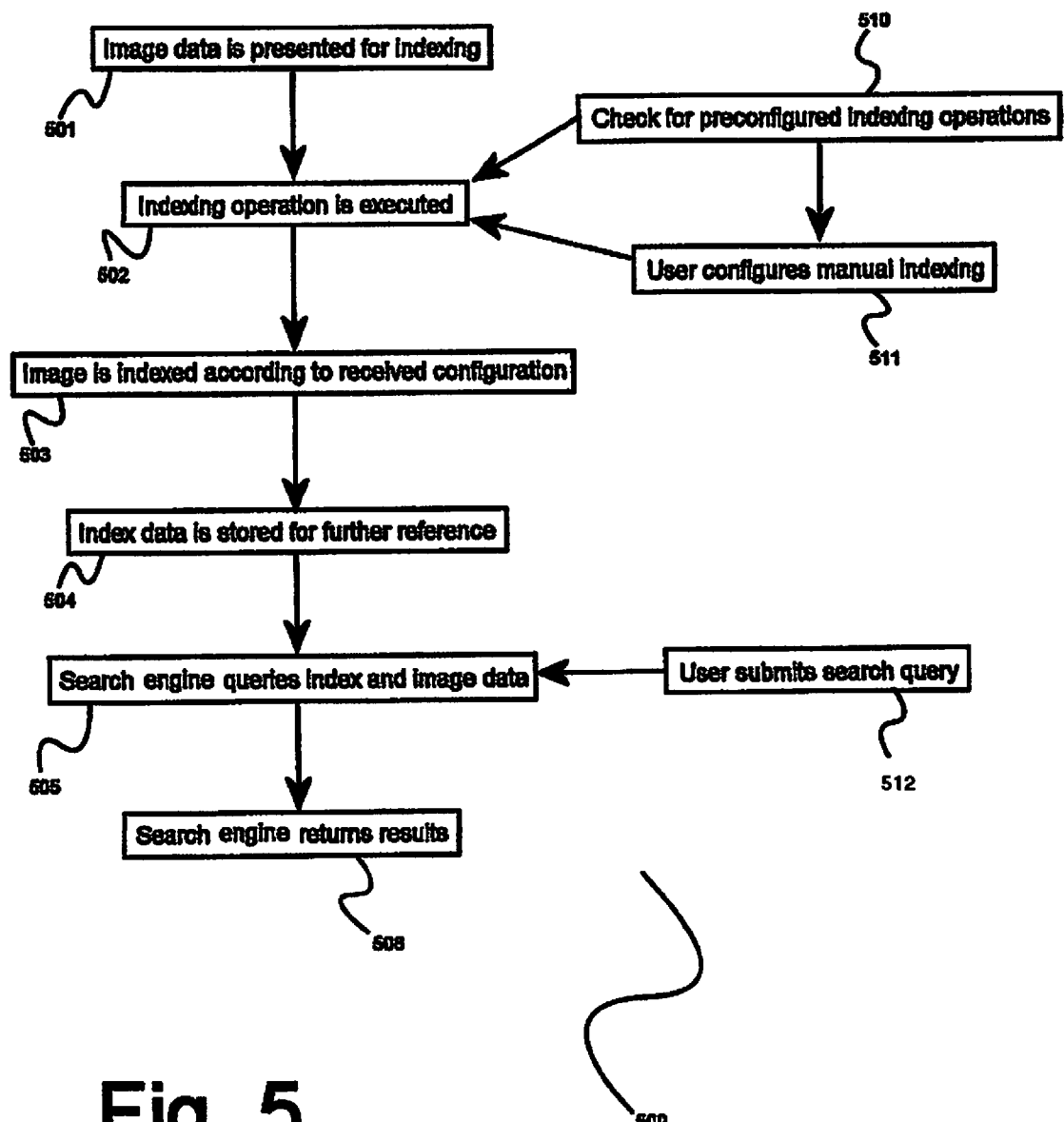
FIG. 5 is a method diagram illustrating an exemplary method for searching mined image data, according to a preferred embodiment of the invention.

FIG. 5 is a method diagram, illustrating an exemplary method 500 for image indexing and search according to a preferred embodiment of the invention. As previously noted (referring to FIG. 4), a variety of useful implementations of a system 400 for image indexing and search may be realized according to the invention, and some exemplary uses are described below in detail. It must be appreciated that any use cases described are purely exemplary, and that the nature of the invention lends itself to a wide variety of particular uses and that any processes or functions described are also exemplary according to specific described implementations, and should not be construed as limitations of the invention except as described in the claims below.

As illustrated, in an initial step 501 image data may be presented for use according to the method 500 of the invention. Such image data may be of varied nature, and may include images, image information or metadata as described previously (such as detailed information pertaining to the location where an image as taken or the device with which it was taken), or any of a variety of relevant information which may be useful to an image-based search operation. It should be appreciated that a feature of such a variable nature is a lack of reliance on any particular format or style of presenting or storing such data—i.e., various existing data stores may be utilized according to the invention, without needing to modify or alter them prior to use. Furthermore, image data may be presented "live", such as capturing an image and immediately processing it according to the steps described below without first storing it, and it should be appreciated that in this manner the method 500 of the invention may be implemented as a "preprocessing" feature for use within or alongside image capture devices, optionally in addition to further additional processing operations. In this manner, for example, a smartphone with a camera for image capture may operate an image indexing software element or "plugin" such that whenever an image is taken, it may be indexed according to the method 500 of the invention such as via steps described below prior to being stored or transferred as is common with such devices (such as taking a picture and immediately sending it to another individual via an e-mail or multimedia message).

In a next step 502, image data may be received or retrieved (such as according to whether such image data was previously stored or is being presented directly from an image capture device, as described previously) by an image indexing engine for indexing, or processing such as to determine index data for further identification or processing. Such indexing may be performed according to a variety of parameters, which may optionally be preconfigured (such as for standalone or automated operation, as may be desirable in a smartphone software plugin as described above) or configurable (such as for real-time or interactive use, as may be desirable in a web-based search engine or other user-interactive software arrangement).

In a substep 510, an indexing engine may consult pre-configured parameters to determine if an automated indexing operation should be executed, such as for scheduled operation. Such a configuration might be useful, for example, for a web search engine operator such as Google™ or Bing™, which might process a large quantity of image data during normal operation such as for traditional search indexing. Such a service might execute periodic, scheduled image indexing operations to mine image data and improve overall search functionality.

In a further substep 511, a user (which may be a human individual, a group such as a corporate IT department, or even a software component designed and configured to operate interactively with an indexing engine) may configure a specific indexing operation to be performed. Such configuration might be desirable, for example, when a user manually adds a quantity of image data and desires to index it for use. As described previously, a user could be a software component rather than a human individual or group, and such software might be configured to operate on an indexing engine interactively on behalf of a user or in a standalone manner. An example of intelligent software operation on behalf of a user might be a virtual assistant or similar artificial intelligence (AI) as is commonly utilized on smartphones and similar electronic devices, wherein a user might request that an indexing operation be performed and a virtual assistant would then handle the particular configuration and execution of the operation without any further interaction. An example of standalone operation might be an AI system designed to intelligently operate with or upon an indexing engine without human interaction, such as might be desirable for large-scale operations wherein a more relevant and directed approach than simple scheduled or preconfigured indexing may be desired, but it may be impractical or undesirable for such operations to be managed by human users (such as in military operations where it may be desirable to process satellite imagery without dedicating personnel to the task).

In a next step 503, image data is indexed according to an executed indexing operation as described above, whether preconfigured or manually configured by a user. An example of preconfigured indexing operations that might be performed could be a search engine operator such as Google™ or Bing™ (as described previously). It might be desirable for such a service provider to index image data according to a schedule due to the large volume of data being processed or for any of a variety of other potential reasons. Scheduled indexing operations could perform a single operation such as (for example) indexing all new images within the last 24 hours at a region-level granularity, and indexing any known individuals (such as might be known from user accounts maintained by a service provider), locations (as might be known from Google Maps™ or similar mapping information accessible by a service provider), or any other high-level details that might be available to such a search provider. Alternately, multiple indexing operations could be preconfigured, such as may be desirable to perform a series of indexing operations of different granularity, or performing multiple independent operations with different input criteria. For example, it might be desirable to perform an initial pixel-level analysis of terrain information for a service such as Google Maps™, followed by a region-level operation to determine features such as desert or cities, followed by a final scene-level operation to determine statistical data such as land area covered by such terrain types, or population data for cities indexed. It should be appreciated that due to the broad nature of such providers, a wealth of information may potentially be available for use in indexing operations, and that a wealth of uses may be realized and indices produced, again due to the broad nature of such an implementation. In this manner, such a use case can be seen as an example of the desirability and utility of a scalable architecture according to the embodiment.

An example of user-configured indexing operations might be a military arrangement, wherein satellite imagery may be received and indexed for specific features that may be desirable for military use. Such indexing might, for example, incorporate logic specifically searching for or ignoring certain features based on the nature of a specific area being surveyed, such as singling out vehicles (such as might be useful for searching for airfields or convoys), or improving indexing efficiency without spending computing resources or time indexing known or expected features (such as ignoring forests in an area known to be largely forested). Another exemplary use of such military operation might be selecting a granularity for indexing based on known image data, such as performing pixel-level terrain analysis when presented with a satellite image of a large open or undeveloped area, while alternately performing higher-level indexing operations when presented with a photograph of a location or group. For example, when presented with an image of a group of individuals, based on the location in which the photograph was taken (if such information is available), an indexing operation could be performed specifically for foreign military personnel or known terrorist leaders. In this manner, the desirability and utility of a flexible nature according to the embodiment can be appreciated, as exemplified by described arrangements for varied uses such as military analysis or service provider implementations for improved service functionality.

In a next step 504, resultant index data from indexing operations previously described may be stored for further reference, such as in a database or similar data store. Such a data store may be of varied nature as described previously (referring now to FIG. 4), and may be the same data store from which image data was retrieved initially or a separate, distinct store such as (for example) a dedicated storage medium for index data specifically. Index data may comprise a variety of data types, but it should be particularly appreciated that keyword- or otherwise text-based index data may be utilized, facilitating a novel text-based approach to image-base searching, thereby bridging existing technological gaps in search functionality. In this manner, image data may be processed to produce text-searchable index data accessible via existing or novel search engines and via text-based search methods already familiar to end users and implemented in existing technologies. In this manner, it should be appreciated that any existing search technology could be utilized according to the invention, facilitated both by a modular architecture as described previously (referring to FIG. 4) as well as text-based operation.

As envisioned by the inventor, index data may be stored in a consistent format or style (as opposed to image data, which may be received in a variety of formats and from a variety of sources so as to facilitate a more adaptable and flexible function for use with existing image data), so as to facilitate a standard that may be utilized by various modular indexing engines, search engines, or other system components, as well as to provide a standardized and consistent data medium for developers, enabling more efficient and robust engine development. It should be appreciated that such a standardized approach is exemplary (though as envisioned by the inventor, ideal), and it may be desirable to utilize variable formatting for indices according to the invention, such as user-configurable index styles as may be desirable for individual use. Such an implementation might be a software application that might allow a user to configure indexing format for processing of image data (i.e., personal photos captured by or stored within a device), such as for organizing image collections according to personal preference.

In a next step 505, search engine 430 may access stored image or index data during a search operation. Such a search operation may be automated or user-initiated via a substep 512, such as search querying as is common in the art. As described previously (referring to FIG. 4), existing search engines may be utilized according to the invention, such as in an exemplary configuration described previously wherein a search provider may operate image indexing to enhance the operation of their provided services. Expanding upon this exemplary configuration, a search provider might utilize an external indexing service (such as may be provided by a third-party provider operating an indexing service and performing indexing operations according to the embodiment as described previously), accessing such third-party image or index data with their existing search technologies to enhance functionality and user experience without developing or incorporating in-house indexing capabilities. In this manner, further flexible functionality can be appreciated in that the nature of the invention is adaptable to a distributed or cloud-based operating paradigm, wherein individual components may be operated by separate vendors or providers, facilitating a "software as a service" operating model as may be desirable for some implementations of the invention.

An example of an automated search operation might be a further military use case, wherein a quantity of image data or index data may be automatically searched for specific features or elements. Such an implementation may be desirable for military operations as described previously, wherein image data might have been automatically indexed and resultant indices stored. Such indices, such as indexed terrain features or individuals, might then be automatically queried such as for names of known terrorist leaders or keyword-based automated searches such as searching for any indices corresponding to specific types of military equipment (such as types of military vehicles that might be identifiable via image indexing). In this manner it can be appreciated that such automated searching may be useful for "passive" detection or monitoring, that is, automated indexing of images and subsequent searches operating upon resultant indices, such as for detecting military formations or encampments, locating specific individuals, or tracking particular individuals such as by monitoring indexed location and time information. It should be appreciated that such implementations may be desirable not only for military but for a variety of monitoring or detection purposes and such a military use is provided only by way of example, and that a wide variety of uses for such functionality may be realized according to the invention, and it should be appreciated that such varied use is a key element of the scalable, flexible, and adaptable nature of the invention.

In a final step 506, search results are returned. Results may be presented to a user that initiated a search, or may be recorded for further reference as might be appropriate for automated searches as described above—that is, passive detection or monitoring implementations might record all "hits", or positive matches found, for any of a variety of purposes. One example of such use of recorded search data might be a census bureau or similar surveying organization. Such an organization may operate passive indexing of image data made accessible to them (such as map data obtained from Google Maps™ or similar freely-accessible mapping resource), followed by automated searching of indices for population information or natural features such as forested areas. Results of such searches may then be collated and stored, such as for later retrieval and use in statistical analysis or surveying—for example, recording total land area covered by forest or areas of urban expansion. It should be appreciated that in this manner, a fully-featured automated implementation may be possible according to the invention, facilitating a "hands-free" image mining solution that may add value to or enable new function for existing services, or enable entirely new areas that were previously impossible or impractical due to limitations of existing technologies.

Figure 6:
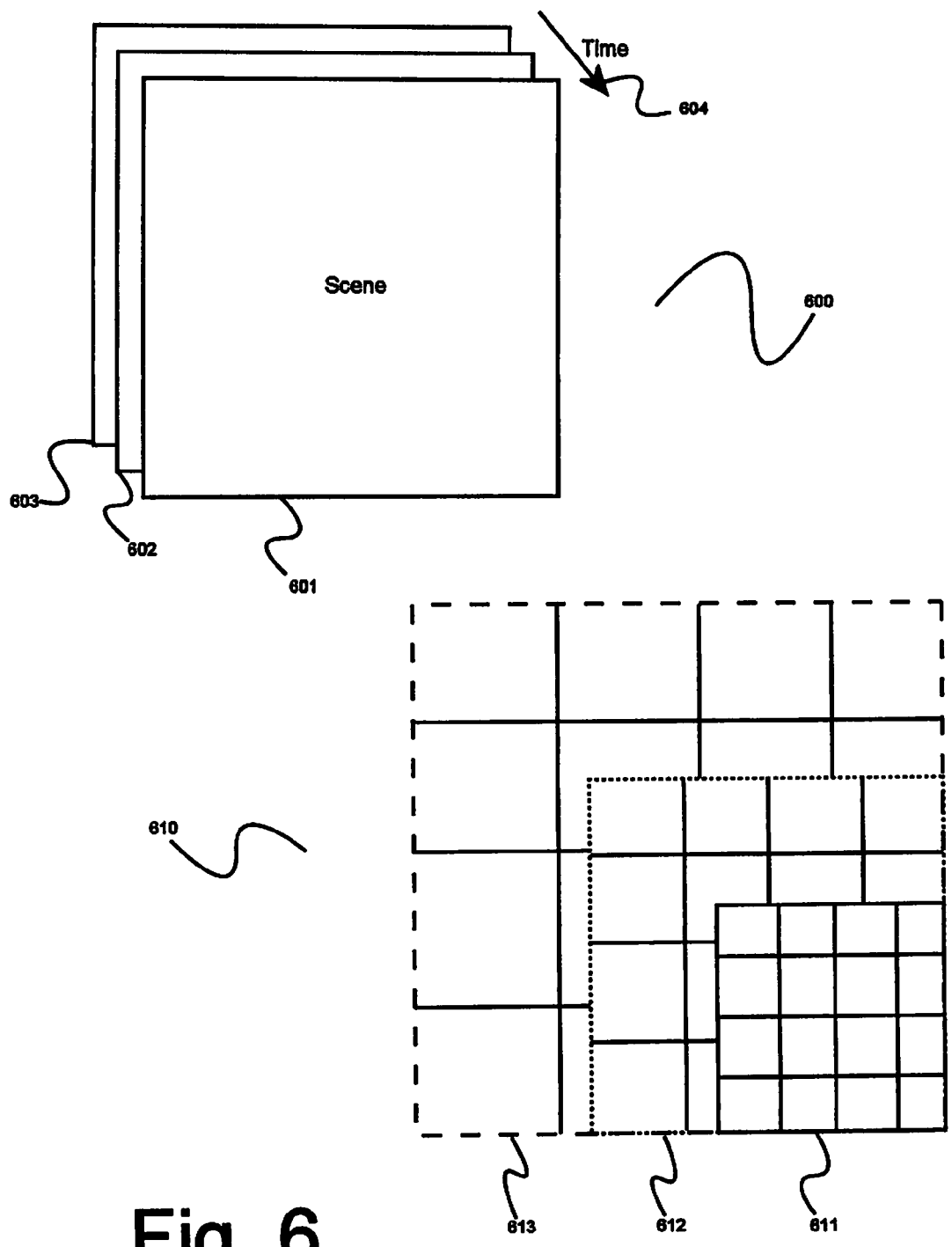
FIG. 6 is a block diagram illustrating an exemplary system for search over multi-resolution on a multi-temporal grid of images, according to a preferred embodiment of the invention.

FIG. 6 is a block diagram illustrating an exemplary system for search over multi-resolution on a multi-temporal grid of images, according to a preferred embodiment of the invention. As illustrated, resolution set 610 may comprise a plurality of resolutions (that is, a level of detail that an image may hold) for automatic recognition of elements within image data 411. Indexing engine 420 may operate upon image data 411 in one or more levels of image resolutions 611 to 613 That is, a resolution that may provide an ability to classify a number of effective descriptive components that image data 411 may have with respect to elements within image data 411 (for example, water, trees, parking lot, vehicles, etc.) for recognition and classification of image data 411. For example, image resolution 611 may be a pixel level resolution (that is, a resolution that holds pixel-level features such as textural properties, a land-cover classification, etc.), image resolutions 612, may be a region-level resolution (that is, a resolution that holds region-level features such as observations that may have shape properties, for example, area, perimeter, compactness, elongation, eccentricity, etc., spatial relationships, such as, arrangement, distance, etc., object classifications, such as a school, paring lot, swimming pool, plane, shopping mall, etc., and the like.), and image resolution 613 may be a scene-level resolution (that is, a resolution that holds scene-level features such as those that may aggregate statistics on lower level features, such as, percentage land cover, for example, 25% deciduous forest, 10% water, etc., aggregate object counts, for example, 10 schools, 35 parking lots, etc., other descriptive classifications, for example, desert, city, rainforest, etc.). It should be appreciated that one or more optimization levels 611 to 613 may be dynamically changing for a different scene or concept. In some embodiments, a large number of resolution levels may be required for final a feature extraction set of image data 411. In another embodiment, only one level of optimization 611 may be captured by image capture device 412 and/or indexed by indexing engine 420 for feature recognition and classification of image data 411. It should be appreciated that one or more images of varying degrees of resolutions may be captured by image capture device 412 while in another embodiment, image data 411 captured by image capture device 412 may be decomposed into one or more additional levels of resolutions 611 to 613 to provide a plurality of resolutions for recognition of features within image data 411 by, for example, using machine learning to derive a higher level of features (for example, land cover, land use, objects, etc.)

Referring again to resolution set 610, image data 411 is divided into different tiles within each resolution 611 to 613. That is, image data with resolution 613 may have larger tiles representing a scene-level resolution that may, for example, encompass scene-level features within image data 411 (for example, amount and type of land cover, object counts, etc.) whereas, resolution 611 of image data 411 may, for example, provide detail at a region-level resolution (for example, region-level features with observations that may have shape properties, such as, area, perimeter, compactness, elongation, eccentricity, etc., spatial relationships, such as, arrangement, distance, etc., object classifications, for example, a school, paring lot, swimming pool, plane, shopping mall, etc., and the like, of image data 411. In some embodiments, resolution 611 may include the same feature in a plurality of resolutions but with differing aspects (for example, color intensity, rotation, position, relationship to other elements, etc.) and/or an increased level of detail for a feature of image data 411.

Referring now to scene set 600, according to the invention, image capture devices 412 may capture a plurality of image data 411 over a period of time 604 resulting in a plurality of images for image data 411 during time period 604. For example, image data 411 may be of a parking lot in a shopping mall. Scene 603 of image data 411 may be captured by image capture device 412 at the beginning of time sequence 604, after a period of time (for example, five minutes), image capture device 412 may capture scene 602 of image data 411, and so on. Image indexing engine 420 may process each scene in a variety of ways to generate index information 421, which may then be stored (such as, in a database 410) for further use, refinement, and/or decomposition.

Each resolution 611 to 613 of image resolution set 610 may include more detail on the same image data 411 depending on which resolution is viewed. For example, contour lines, texture, surface composition, number of sub elements, characteristics of features, etc. One or more resolutions 611 to 613 may contain quantitative summary statistics indexed by indexing engine 420 at each resolution 611 to 613 for each resolution tile for each time slice 601 to 603 to produce indices 421 for each resolution 611 to 613 by time period 604. In some embodiments a time period 604 may not be used. Each resolution 611 to 613 may also be made accessible to search engine 430 such as to enable querying of index data 421 for each resolution 611 to 613. In this manner, indexing engine 420 may process image data 411 for one or more resolutions (whether by using a plurality of resolutions captured by image capture device 412 for image data 411 or by decomposition of image data 411 into one or more additional resolutions). Search engine 430 may then utilize resulting indices 421 to perform a more relevant or precise search operation by accessing the necessary resolution from resolution set 610 needed to satisfy the search. For example, a search for vehicles within image data 411 which may have a plurality of resolution 613 (representing large elements, for example, a landscape of mountains in the wilderness), resolution 612 (representing medium sized elements, for example, paths and roadways in the landscape), and resolution 611 (representing smaller elements within the landscape, for example, people, animals and vehicles, etc.), search engine 430 may use indices 421 of resolution 611 of image data 411 to fulfill the search query from said example of a search for vehicles within image data 411. In a preferred embodiment, users 441 may wish to search on characteristics of image data 411 over a period of time 604. For example users 441 may desire to search for changes that may have occurred within image data 411 over time period 604. For example, in a business application a business owner may wish to understand traffic patterns in several roadways in a city before deciding where to construct a business that is dependent on traffic (for example, a drive through coffee establishment). In this example, users 441 may search for images where a resolution where vehicles can be identified in order to understand different traffic patterns of vehicles within image data 411 from analysis of multiple scenes 601 to 604 over time period 604.

Table 1 is a table representing feature descriptions and an associated identifier ID corresponding to the feature within image data 411. For example, in a scenario where image data 411 may be an image of a terrestrial landscape, descriptor 1 may correspond to a roof of a building, descriptor 2 may correspond to a body of water, descriptor k may correspond to a parking lot, and so on. For each descriptor, an ID in the first column of the same row is associated to identify each feature. In some embodiments, one or more features (for example, buildings, roads, etc.) within image data 411 may be encoded with location information, for example, GPS coordinates of the feature and stored in database 410. It can be appreciated by one having ordinary skills in the art that there are many techniques for classes of computer program-level services used to determine and record location. In some embodiments, a feature (for example, roadways) that may be present within image data 411 may compute quantitative measurements (for example, size of feature, orientation of feature, quantity of like features, etc.) and store them in database 410. In some embodiments, quantitative measurements may be discretized and transformed into keywords. For example, a tile within image data 611 may contain 20% water. A keyword representation for 20% water may be characterized as water_05 water_10, water_15, water_20. In another embodiment, a keyword representation for 20% water may be characterized as water, water, water, etc. (were keyword water is repeated 20 times). In this example, a search for 10% water may match tiles within image data 611 that had 20% water. For the presence of sub-features of a feature, a similar encoding may be used and may contain a quantity encoding. For example, one or more tiles of image data 611 that contains a water feature may also contain one or more docks within the water feature. For example, a tile with 30 docks, a string encoding may be encoded a similar fashion as for a water feature. That is, a quantity of 30 docks may be encoded as dock_05, dock_10, dock_20, dock_30.

TABLE 1 vocabulary table

| ID | Descriptor |
|---|---|
| V1 | descriptor 1 |
| V2 | descriptor 2 |
| ... | ... |
| Vk | descriptor k |

Table 2 is an exemplary table of an inverted index for feature presence of features within image data 612. Table 2 comprises a column labeled ID and one or more columns T1 through Tn corresponding to a tile in image data grid 612. Each field in the ID column comprises a descriptor ID that corresponds to a feature description (as denoted by Table 1) that may be present in image data 612. For each field in columns T1 through Tn a "1" denotes the corresponding feature is present in the tile for image data 612 (for example, on row V1, A "0" under column T1 denotes that feature descriptor 1, for example, a roof, may not present in tile 1 of image data 612, and so on. A similar table for each resolution 611 to 613 may be used to arrange feature presence.

TABLE 2 exemplary inverted index for feature presence

| ID | T1 | T2 | T3 | T4 | ... | Tn-3 | Tn-2 | Tn-1 | Tn |
|---|---|---|---|---|---|---|---|---|---|
| V1 | 0 | 1 | 0 | 1 | | 1 | 1 | 0 | 1 |
| V2 | 1 | 1 | 0 | 1 | | 1 | 1 | 1 | 0 |
| V3 | 0 | 0 | 1 | 1 | | 1 | 0 | 1 | 0 |
| V4 | 1 | 1 | 1 | 0 | | 0 | 1 | 0 | 1 |
| ... | | | | | | | | | |
| Vk-1 | 0 | 1 | 1 | 1 | | 0 | 0 | 0 | 1 |
| Vk | 1 | 0 | 0 | 1 | | 0 | 0 | 0 | 0 |

In some embodiments, a feature's quantity may be encoded using a graphical representation of a distribution of data, for example, a histogram. In this example, a histogram may be encoded to have bins labeled for each feature that may, or may not, be present (for example, water, roof, forest, road, sand, grass) where the height of each bin may represent a quantitative measurement for each of the corresponding features. In a preferred embodiment, a string whose character length is equivalent to the number of bins on the histogram (herein, referred to as "encoding string") may be used to represent a quantitative measurement for each feature of each tile of image grid 611. For example, in a scenario where image data 411 included features such as 10% water, 20% roof and 50% forest, 20% grass, a string representing a quantitative measurement for features such as, water, roof, forest, road, sand, and grass, a possible encoding string may be characterized as 125002. That is a digit that represents the first integer of the quantity stated above, for example, 10% water would be summarized as a single digit "1", 20 roof would be summarized as a single digit "2", and so on. For features that may not be present, a number "0" may be used. In the example above a "0" was used for road and sand, since none were present in the example.

In a preferred embodiment, users 441 may perform a search on one or more features by encoding search features in a similar sting encoded fashion as described above for feature presence within image data 411. For example, user 441 may desire to find the areas within image data 411 that may contain 20% forest or more. In a scenario where water, roof, forest, road, sand, and grass are categorized and string encoded for image data 411, a search for 20% forest may be encoded by search engine 430 as "002000" (herein, referred to as "search string"). Search engine 430 may access indices 421 to select an appropriate resolution for image data 411, for example, resolution 613. By comparing the search string to a string encoding value for each tile in table 2 (that is a table indicating which features are present for resolution 613), search engine 430 may determine which tiles contain 20% forest. In some embodiments, search engine 430 may use an edit distance between the search string and encoded strings for features as a search result (for example, the number of edits required transform the search string into an encoded feature string). It can be appreciated by one having ordinary skills in the art that one of many algorithms may be used to calculate edit distance or Levenshtein distance to calculate the number of operations required to transform a search string into an encoded string representing features within image data 611 to determine search results.

Figure 7:
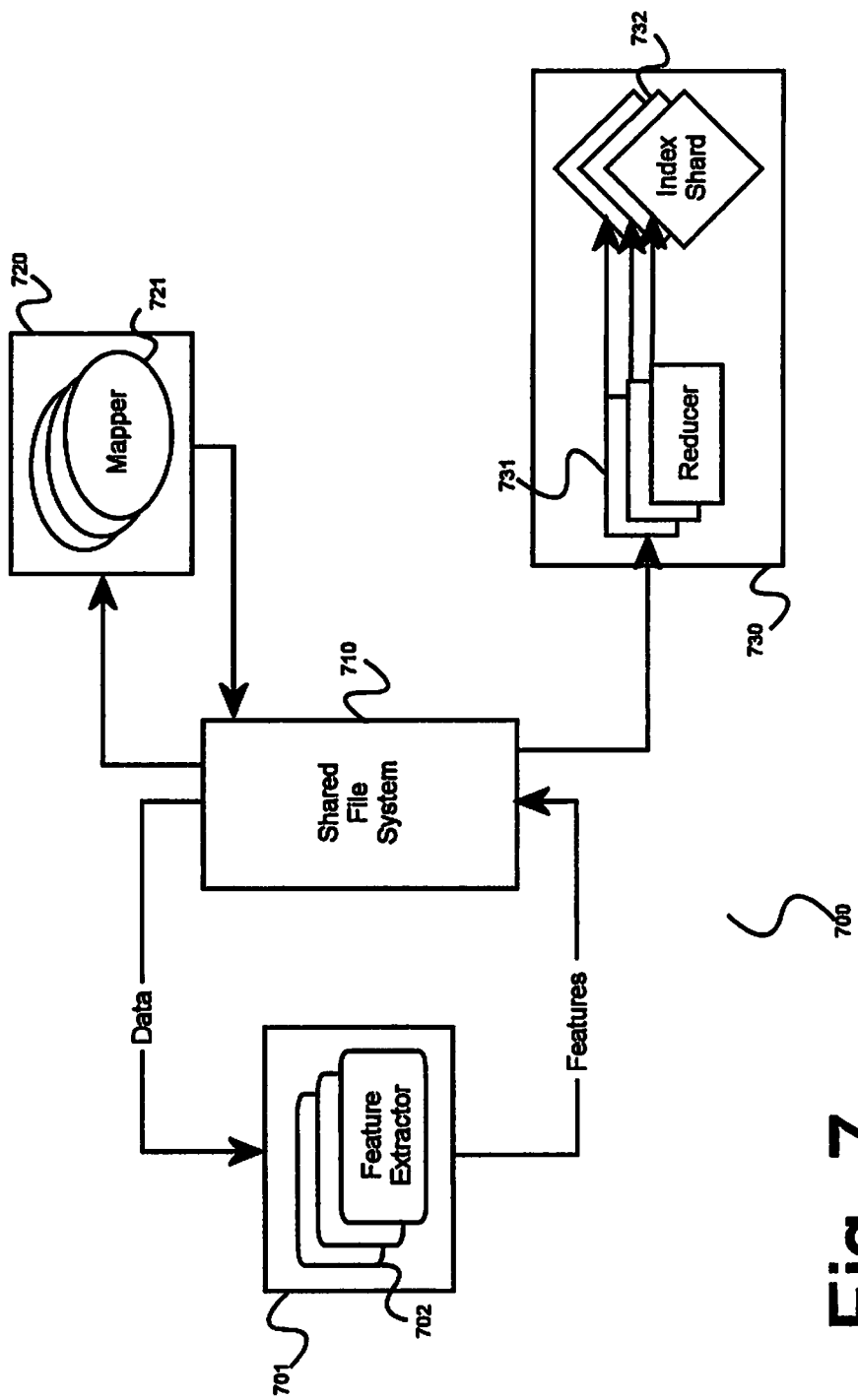
FIG. 7 is a block diagram illustrating an indexing data flow for image search according to a preferred embodiment of the invention.

FIG. 7 is a block diagram illustrating an indexing data flow for image search according to a preferred embodiment of the invention. Indexing system 700 comprises a plurality of feature extractors 701, a shared file system 710 a plurality of mappers 720, a plurality of reducers and index shards 730.

Index engine 700 classifies image data 411 into indices 421 accessible via search engine 430 by using one or more feature extractors 701. It can be appreciated by one having ordinary skill in the art that one of many algorithms for feature recognition may be used to identify features within image data 411. By choosing discriminating and independent patterns of image data 411 from shared file system 710, feature extractor 702 classifies image data into pixel level features, (for example, textural properties, a land-cover classification, etc.), region level features, (for example, observations that may have shape properties, such as, area, perimeter, compactness, elongation, eccentricity, etc., spatial relationships, such as, arrangement, distance, etc., object classifications, for example, a school, parking lot, swimming pool, airplane, shopping mall, etc.), and scene level features, such as, percentage land cover (for example, 25% deciduous forest, 10% water, etc.), aggregate object counts (for example, 10 schools, 35 parking lots, etc.), other descriptive classifications (for example, desert, city, rainforest, etc.), and the like. Once feature extraction is complete, results are written back to shared file system 710.

In a preferred embodiment, features within image data 411 are analyzed by tiles within one or more resolutions 611, 612, 613, etc. In some embodiments, there may be only one level of resolution for feature extraction. In other embodiments, there may be additional levels of resolutions for image data 411.

In some embodiments, additional levels of feature classifications (for example, lower level and higher level classification) may be used to extract features by one of more feature extractors 702.

In a particular embodiment, feature extractors 701 may be architected in a modular feature extraction framework. For example, to allow feature extraction to be written in any language (for example, GPU, CUDA, IDL, python, and the like), to allow modules to be developed with specific algorithms to solve particular problem (for example, detecting specific feature elements such as those that may only be present in a certain locale or have a unique signature, etc.). Furthermore, a modular approach allows for distributed computing for efficiency of computational processing (for example, to offset computational load across a plurality or processing engines when processing large datasets).

Once features are extracted by feature extractors 701 to shared file system 710, mapper 721 processes the feature into many mapping nodes and is sorted by a key (for example ID 1, ID 2, etc. of Table 1). Reducer 731 performs an intermediate shuffle phase that merges the mapping output from mapping nodes 720 and sorts by the key and are distributed to a reduce set of nodes such that they each consume a partition of data and produce an inverted index shard partition 732. Once complete, feature data is sorted and aggregated by tile id (for example, T1, T2, etc. in Table 2) within image resolution 611. A plurality of reducers 731 are chosen such that the number of index shards 732 required to partition image data 611 for a one or more feature set or one or more resolutions, are produced. In some embodiments a matric such as Table 2 may be produced to indicate the presence of features (for example, feature V1 from Table 2 which corresponds to descriptor 1 from Table 1) for each tile (for example, tile T1 from Table 2).

The skilled person will be aware of a range of possible modifications of the various embodiments described above. Accordingly, the present invention is defined by the claims and their equivalents.

What is claimed is:

1. A system for modular image mining and search, the system comprising:
    a plurality of image capture devices stored and operating on a plurality of network-attached computer;
    an indexing engine software module operating on a first network-attached server computer and configured to:
    index image data captured by the plurality of image capture devices by performing the following steps:
    for each of a plurality of spatial scales, dividing each image of the captured image data into a plurality of tiles of the corresponding spatial scale, thereby generating a set of tiles of varying spatial scales for each image;
    using a plurality of feature extractors, automatically extracting a plurality of features for each tile;
    generating a vector for each tile, the vector comprising a numeric value for each of the plurality of features corresponding to a degree of presence of each corresponding feature; and
    composing the set of generated vectors into an inverted feature presence index;
    wherein the indexing and categorization of image data is performed using automated feature extraction at multiple spatial scales, including at least pixel level features, scene level features including object identities, locations and counts, and region level features, and at multiple times;
    an image information database operating on the first network-attached server computer and adapted to receive and store image data and indices from the indexing engine software module;
    an interface software module operating on a second network-attached computer; and
    a search engine software module operating on a second network-attached server computer and configured to receive text-based search requests from users via the interface software module for searches of elements and features within an image.

2. A method for searching mined image data, the method comprising the steps of:
    (a) indexing image data using an indexing engine software module stored and operating on a first network-attached server computer and based on images captured from a plurality of image capture devices, and storing the image data and a plurality of indices generated by the indexing in a database; and
    (b) searching the image data and the image indices using a search engine software module stored and operating on a second network-attached server computer based on input by a user through an interface software module stored and operating on a network-attached client computer;
    wherein the indexing of image data is performed using automated feature extraction at multiple spatial scales, including at least pixel level features, scene level features including object identities, locations and counts, and region level features, and at multiple times;
    wherein the indexing engine software module indexes image data captured by the plurality of image capture devices by performing the following steps:
    for each of a plurality of spatial scales, dividing each image of the captured image data into a plurality of tiles of the corresponding spatial scale, thereby generating a set of tiles of varying spatial scales for each image;
    using a plurality of feature extractors, automatically extracting a plurality of features for each tile;

generating a vector for each tile, the vector comprising a numeric value for each of the plurality of features corresponding to a degree of presence of each corresponding feature; and composing the set of generated vectors into an inverted feature presence index.

3. A system for searching over multiple spatial resolutions on a multi-temporal grid of images, the system comprising:

an image storage repository operating on a network-attached server computer and storing a plurality of images each stored at a plurality of spatial resolutions the plurality of spatial resolutions of each of the plurality of images decomposed from the respective image as captured by a plurality of image capture devices that capture the plurality of images over a period of time and store them in the image storage repository with timestamps;

an indexing engine software module operating on a first network-attached server computer and configured to analyze the plurality of images is analyzed by:

performing automated feature extraction at multiple spatial scales, including at least pixel level features, scene level features including object identities, locations and counts, and region level features, and at multiple times; and indexing image data captured by the plurality of image capture devices by performing the following steps:

for each of a plurality of spatial scales, dividing each image of the captured image data into a plurality of tiles of the corresponding spatial scale, thereby generating a set of tiles of varying spatial scales for each image;

using a plurality of feature extractors, automatically extracting a plurality of features for each tile;

generating a vector for each tile, the vector comprising a numeric value for each of the plurality of features corresponding to a degree of presence of each corresponding feature; and composing the set of generated vectors into an inverted feature presence index; and a search engine software module stored and operating on a network-attached server computer and configured to:

select an appropriate image resolution from a set of resolutions to conduct an automated search of features and elements within the image data by using indices and image data from the image storage repository; and conduct a search of images or changes within a scene over a period of time in a set of images captured by a plurality of image capture devices.

* * * * *